F. H. PETITMAIRE.
SHOCK ABSORBER FOR MOTOR VEHICLES.
APPLICATION FILED SEPT. 22, 1914.

1,146,901.

Patented July 20, 1915.
2 SHEETS—SHEET 1.

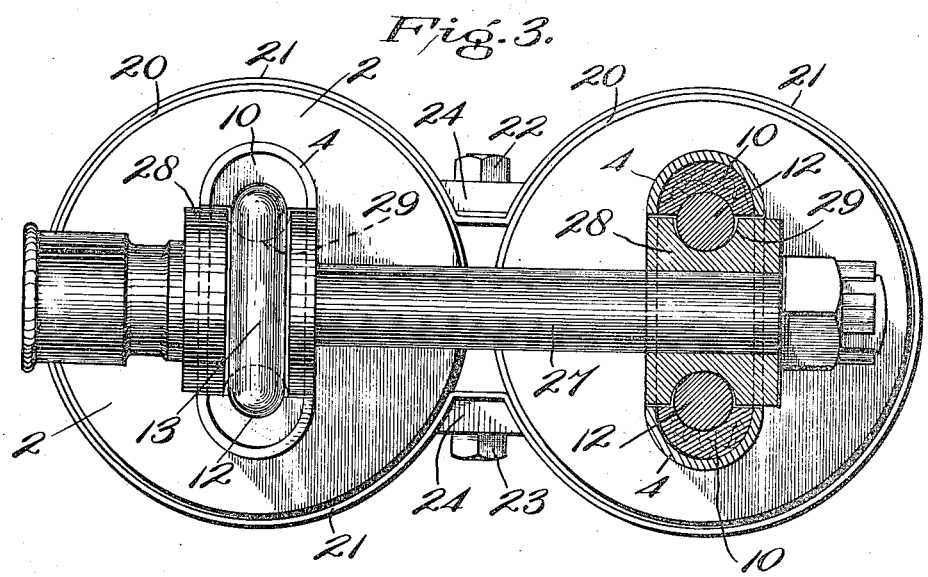
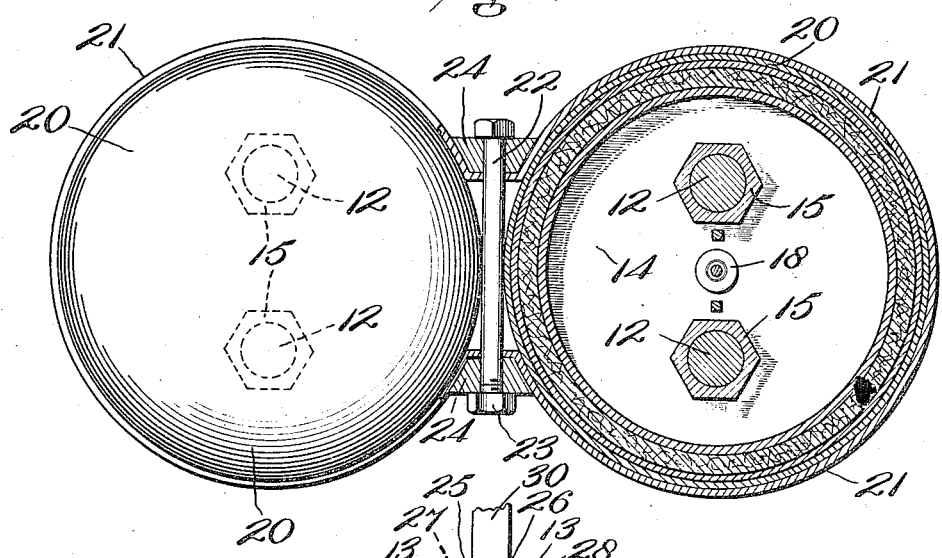
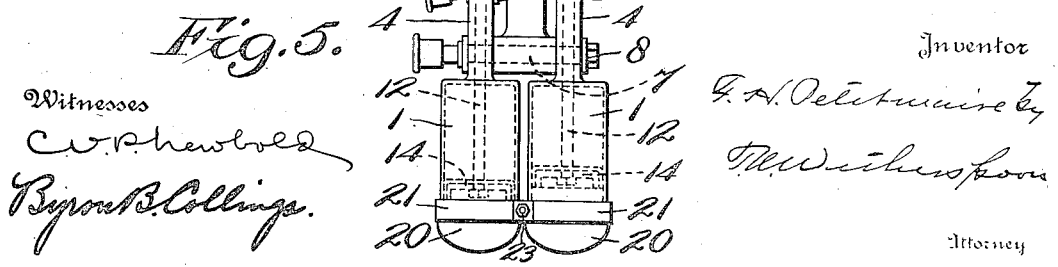

UNITED STATES PATENT OFFICE.

FELIX H. PETITMAIRE, OF PHILADELPHIA, PENNSYLVANIA.

SHOCK-ABSORBER FOR MOTOR-VEHICLES.

1,146,901.      Specification of Letters Patent.    Patented July 20, 1915.

Application filed September 22, 1914. Serial No. 862,908.

*To all whom it may concern:*

Be it known that I, FELIX H. PETITMAIRE, a citizen of the Republic of France, residing at Philadelphia, in the county of Philadelphia and State of Pennsylvania, have invented certain new and useful Improvements in Shock-Absorbers for Motor-Vehicles; and I do hereby declare the following to be a full, clear, and exact description of the invention, such as will enable others skilled in the art to which it appertains to make and use the same.

This invention relates to shock absorbers, and has for its object to improve the construction of the absorber illustrated in U. S. Patent No. 1,015,682, dated January 23, 1912, entitled Suspension spring for vehicles, and issued to L. P. C. J. Jacquet.

To these ends the invention consists in the novel details of construction and the combinations of parts more fully hereinafter disclosed and particularly pointed out in the claims.

Figure 1:
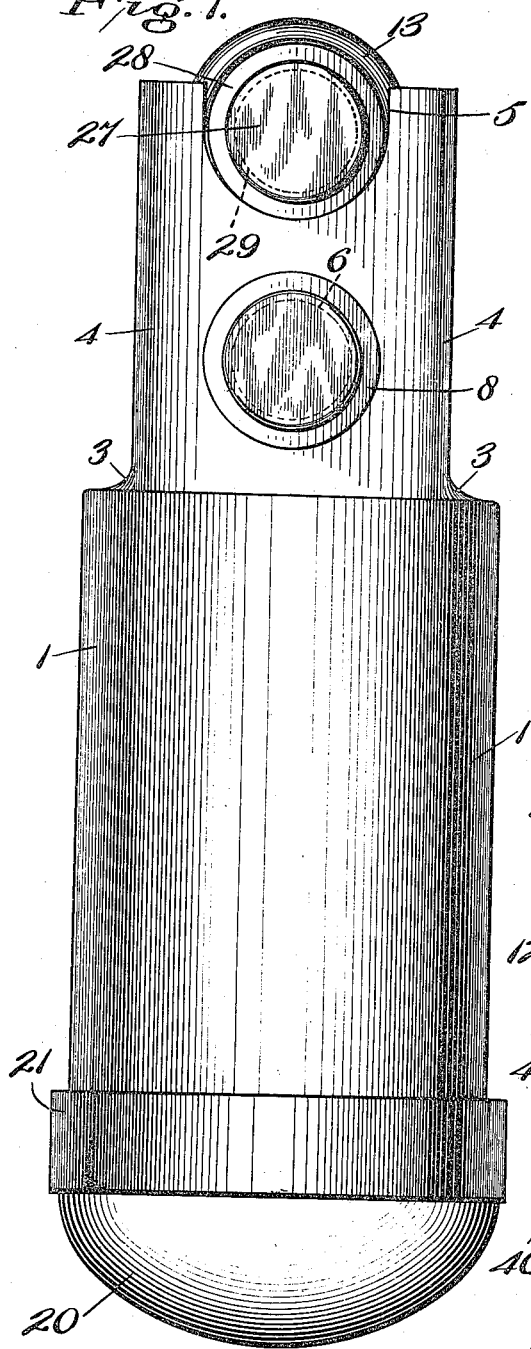
Figure 2:
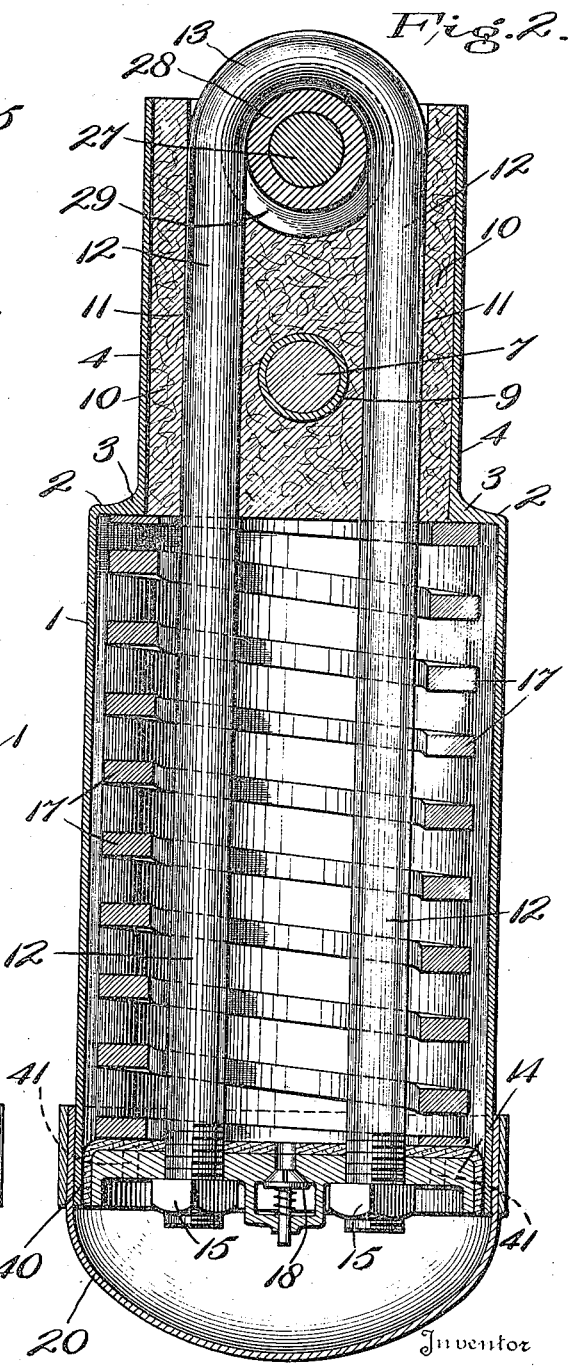

Referring to the accompanying drawings forming a part of this specification in which like numerals designate like parts in all the views, Figure 1 is a side elevational view of one of the cylinders constituting my shock absorber; Fig. 2 is a longitudinal sectional view of the parts shown in Fig. 1; Fig. 3 is a plan view partially in section of a pair of cylinders such as illustrated in Figs. 1 and 2, and showing them firmly bound together by a band; Fig. 4 is a bottom plan view partially in section of the parts shown in Fig. 3; and Fig. 5 is a diagrammatic elevational view of a pair of cylinders illustrating their operation when the vehicle suspension spring is subjected to twisting strains.

1 indicates a cylinder preferably of drawn steel, flanged as at 2, and having welded thereto as at 3 the elliptical extension 4, cut away as at 5, and provided with the orifices 6, through which pass the bolts 7 having the heads 8 and sleeve 9. Inside the elliptical extensions 4 I provide the solid antifriction blocks 10 provided with the holes 11 to form elongated bearings for the reciprocating rods 12 joined as by a curved integral connection 13. The lower ends of said rods 12 are screw threaded and pass through a piston 14 to which they are secured as by the nuts 15. Between said piston and the flange 2 is located the cushioning spring 17, and when an auxiliary air cushion is desired I preferably provide said piston with a check valve such as 18. In such cases I also provide over the lower end of the cylinder 1, a cap 20 to confine the air, but this is not essential in all cases. The above cylinders are employed in pairs as will be clear from Figs. 3, 4 and 5 of the drawings, and are preferably connected together in a substantially rigid manner by means of a band or double ring member 21. This said band 21 is slipped over the lower portion of each of the cylinders 1 and clamped in position by any suitable means, such as a bolt 22 and nut 23. Suitable washers or other spacing members such as 24, may also be provided.

25 designates one member of the well known type of body spring employed in automobile body suspensions through the eye 26 of which passes a bolt 27, carrying the sleeves 28. The said sleeves are grooved as at 29, for the reception of the curved portion 13 of the rods 12, as will be clear from the drawings.

30, Fig. 5, indicates the second member of the body suspension spring or other suitable connection with the body of the car.

The piston 14 may be of any desired construction but when it is desired to secure an air cushioning effect I preferably make it of a slightly smaller diameter than the internal diameter of the casing 1. This permits the slow escape of air through the space 40 from one side of the piston to the other on the down stroke, while the check valve 18 assists such escape of air on the up stroke and permits the spring 17 to cushion the shock. The escape of air may also in some cases, be facilitated by perforations 41 through the piston.

In the absorbers of this type heretofore proposed the upper portion of the casing corresponding to my extension 4 has generally taken the form of a solid casting screw threaded or otherwise detachably secured to the lower portion of said casing, as illustrated in the said Jacquet patent, above mentioned. In such a construction the said casting formed the elongated bearing for the rods such as 12, and as the parts were subjected to very severe strains they in time wore loose and the absorber became more or less inefficient. In that event it was necessary to either replace the worn casting with a new one or else substitute an entirely new absorber. On the other hand, with my absorber, employing the antifriction replaceable filling 10, when the holes 11 become worn, it is a comparatively simple and inexpensive operation to remove the caps 20 (should they be employed), bolts 7, sleeves 9 and nuts 15 from the ends of rods 12, whereupon the said rods 12 and the antifriction block 10 may be withdrawn from the casing. A new block 10 is then substituted and the parts replaced. This antifriction block and its associated parts, therefore constitute an important feature of my invention.

Another important feature of my invention resides in the fact that when through side motions, or lurches, of the car body the supporting spring 25 (see Fig. 5) is given a twist or is made to assume a plane inclined to the normal plane of the pistons 14, one of said pistons may freely rise, while the other remains stationary, or may descend, according to its position at the time. It results from this action that the wearing or racking strains which would otherwise be taken up in wear of the parts, are absorbed by one or the other of the absorber springs 17, as the pistons independently rise or fall. Therefore, not only is a more comfortable riding assured, but the engine of the car itself is protected from sudden jolts that it would otherwise receive, and its life is thereby prolonged.

It is obvious that those skilled in the art may vary the details of construction as well as the arrangement of parts without departing from the spirit of my invention, and therefore I do not wish to be limited to the above disclosure except as may be required by the claims.

What I claim is:—

1. In an automobile provided with a pair of body suspension members the combination of a pair of cylinders provided with extensions; a readily removable antifriction block provided with extended holes carried by each of said extensions; a U-shaped rod passing through the holes in each block; a piston like member carried by the free ends of each U-shaped rod; means rigidly securing said cylinders together; a connection between each block and one of said suspension members; a connection between each U-shaped rod and the other suspension member; and a cushioning spring surrounding each U-shaped rod in each cylinder, whereby said piston like members may readily rise and fall independently of each other, substantially as described.

2. In an automobile provided with a pair of body suspension members the combination of a pair of cylinders provided with integral extensions having cut away portions; a readily removable antifriction block provided with longitudinal and transverse holes carried by each of said extensions and having cut away portions adapted to register with the cut away portions of said extensions; a U-shaped rod passing through the longitudinal holes in each block; a piston like member carried by the free ends of each U-shaped rod; means for rigidly securing said cylinders together; means passing through said transverse holes securing said blocks in said extensions and providing a connection between said blocks and one of said suspension members; means adapted to move in and out of said cut away portions and providing a connection between the closed ends of said U-shaped rods and the other suspension member; and a cushioning spring surrounding each U-shaped rod in each cylinder, whereby said piston like members may readily rise and fall independently of each other, substantially as described.

3. In a shock absorber the combination of a pair of cylinders each provided with a shoulder and an integral extension having a cut away portion; a readily removable antifriction block provided with longitudinal and transverse holes carried by each of said extensions and having cut away portions adapted to register with the cut away portion of said extensions; a U-shaped rod passing through the longitudinal holes in each block; a piston like member carried by the free ends of each U-shaped rod; a band surrounding said cylinders; means for clamping said band on said cylinders, whereby they are rigidly secured together; and a cushioning spring located between said shoulder and said piston like member in each cylinder, whereby said piston like members may readily rise and fall independently of each other, substantially as described.

4. In a shock absorber the combination of a pair of cylinders each open at one end and each provided with a shoulder and an integral extension having a cut away portion; means for closing the open end of each cylinder substantially air tight; a readily removable antifriction block provided with longitudinal and transverse holes carried by each of said extensions and having cut away portions adapted to register with the cut away portions of said extensions; a U-shaped rod passing through the longitudinal holes in each block; a piston like member carried by the free ends of each U-shaped rod; means carried by each of said piston like members for permitting the escape of air from one side to the other of said members; a band surrounding said cylinders; means for clamping said band on said cylinders, whereby they are rigidly secured together; and a cushioning spring located between said shoulder and said piston like member in each cylinder whereby said piston like members may readily rise and fall independently of each other, substantially as described.

5. In an automobile provided with a pair of body suspension members the combination of a pair of cylinders provided with integral extensions having cut away portions; a readily removable antifriction block provided with longitudinal and transverse holes carried by each of said extensions and having cut away portions adapted to register with the cut away portions of said extensions; a U-shaped rod passing through the longitudinal holes in each block; a piston like member carried by the free ends of each U-shaped rod; means for rigidly securing said cylinders together; means comprising a bolt passing through said transverse holes securing said blocks in said extensions and providing a connection between said blocks and one of said suspension members; means comprising a bolt and sleeves adapted to move in and out of said cut away portions and providing a connection between the closed ends of said U-shaped rods and the other suspension member; and a cushioning spring surrounding each U-shaped rod in each cylinder, whereby said piston like members may readily rise and fall independently of each other, substantially as described.

In testimony whereof I affix my signature, in presence of two witnesses.

FELIX H. PETITMAIRE.

Witnesses:
EMILE LEFIN,
F. C. HOMBECK.